Oct. 18, 1932.　　　I. P. WHITEHOUSE　　　1,883,203

JOINT

Filed Oct. 25, 1930

Irving P. Whitehouse
INVENTOR.

BY

ATTORNEYS.

Patented Oct. 18, 1932

1,883,203

UNITED STATES PATENT OFFICE

IRVING P. WHITEHOUSE, OF ERIE, PENNSYLVANIA, ASSIGNOR TO H. C. LORD, OF ERIE, PENNSYLVANIA

JOINT

Application filed October 25, 1930. Serial No. 491,180.

The present invention is directed to joints and particularly joints in which there is a rubber connection between the members, the rubber being secured to the members by bonding, preferably during vulcanization. The joint may be used in many situations. As exemplified it is used as a flexible driving joint. Features and details of the invention will appear from the specification and claims.

A preferred embodiment of the invention is illustrated in the accompanying drawing as follows:—

Figure 1:
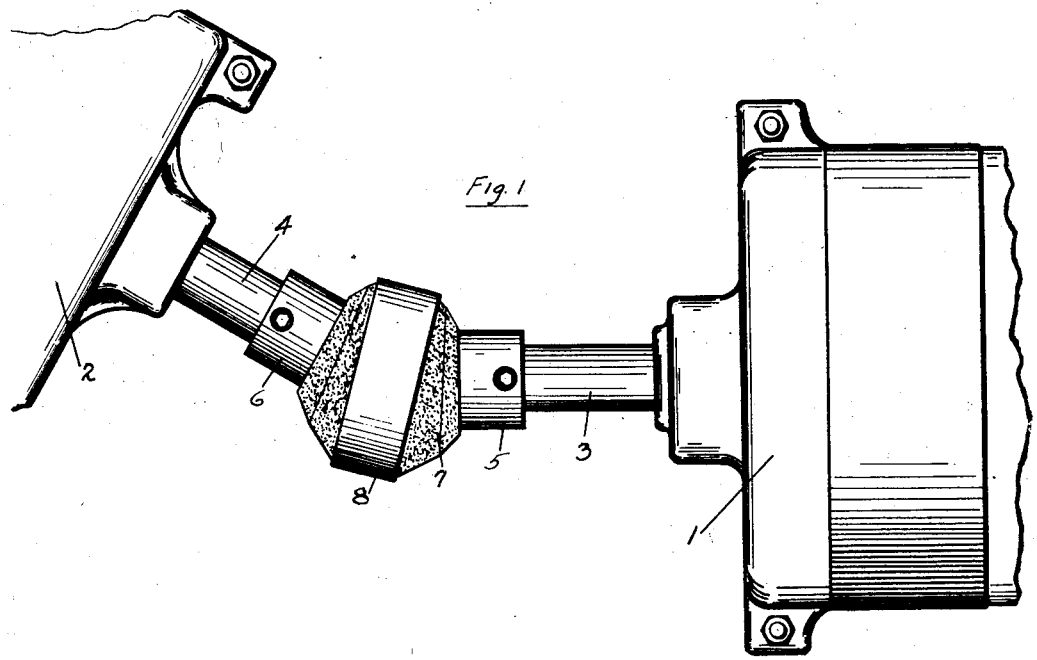

Fig. 1 shows a plan view of the joint in driving relation.

Figure 2:
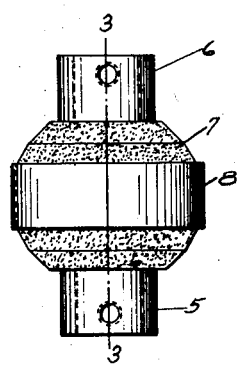

Fig. 2 an elevation of the joint.

Figure 3:
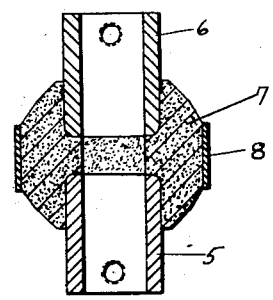

Fig. 3 a section on the line 3—3 in Fig. 2.

Figure 4:
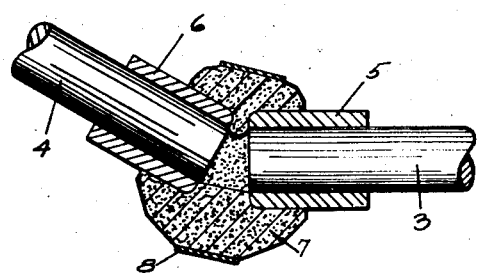

Fig. 4 a horizontal section through the joint as shown in Fig. 1 showing the members in flexed relation.

1 marks the driving member, 2 a driven member, 3 a driving shaft and 4 a driven shaft. The joint arranged between these shafts consists of a sleeve 5 fixed on the shaft 3 and a sleeve 6 fixed on the shaft 4. These sleeves extend into a rubber member 7, but preferably do not abut. The rubber member is bonded to the outer surfaces of the sleeves and may be bonded to the ends of the sleeves. An outer shell 8 is arranged around the joint and the outer surface of the rubber member is bonded to this shell. This metal shell strengthens the joint without materially reducing flexibility. It will readily be seen that with this single joint there is, in effect, a double capacity for flexure, as clearly indicated in Fig. 4. There is a certain amount of relative movement between the members 3 and 4 endwise. The joint may be used simply as a flexible coupling where the members 3 and 4 are intended to be in alinement, the rubber permitting variations in endwise relation and cushioning the same and also slight variations in concentricity. It will be noted that the rubber overlapping the end of the sleeves accommodates a large part of the misalignment through the shear of the rubber. This is particularly true as to that part of the rubber which is nearer the periphery, which is by far the largest mass. This permits of a readier yielding of the joint to misalignment than where the rubber accommodates this entirely by direct stress.

What I claim as new is:—

1. In a joint, the combination of two members to be joined end to end; and a rubber connection having a wall surrounding the ends of the members, the inner surface of the wall being bonded thereto.

2. In a joint, the combination of two members to be joined end to end, said members having their ends spaced apart; and a rubber connection having a wall surrounding the ends of the members, the inner surface of the wall being bonded thereto.

3. In a joint, the combination of two members to be joined end to end, said members having their ends spaced apart; and a rubber connection having a wall surrounding the ends of the members, the inner surface of the wall being bonded thereto, the rubber extending between the ends.

4. In a joint, the combination of two members to be joined end to end; and a rubber connection having a wall surrounding the ends of the members, the inner surface of the wall being bonded thereto, one member driving the other.

5. In a joint, the combination of two members to be joined end to end, said members having their ends spaced apart; and a rubber connection having a wall surrounding the ends of the members, the inner surface of the wall being bonded thereto, one member driving the other.

6. In a joint, the combination of two members to be joined end to end; a rubber connection having a wall surrounding the ends of the members, the inner surface of the wall being bonded thereto; and a metal shell bonded to the outer surface of the rubber.

7. In a joint, the combination of two members to be joined end to end, said members having their ends spaced apart; a rubber connection having a wall surrounding the ends of the members, the inner surface of the wall being bonded thereto; and a metal shell bonded to the outer surface of the rubber.

8. In a joint, the combination of two members to be joined end to end, said members having their ends spaced apart; a rubber connection having a wall surrounding the ends of the members, the inner surface of the wall being bonded thereto, the rubber extending between the ends; and a metal shell bonded to the outer surface of the rubber.

9. In a joint, the combination of two members to be joined end to end; a rubber connection having a wall surrounding the ends of the members, the inner surface of the wall being bonded thereto; one member driving the other; and a metal shell bonded to the outer surface of the rubber.

In testimony whereof I have hereunto set my hand.

IRVING P. WHITEHOUSE.